(12) United States Patent
Handke

(10) Patent No.: US 7,473,036 B2
(45) Date of Patent: Jan. 6, 2009

(54) BEARING FOR A VIBRATION DAMPER

(75) Inventor: Günther Handke, Euerbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 760 days.

(21) Appl. No.: 10/935,511

(22) Filed: Sep. 7, 2004

(65) Prior Publication Data

US 2005/0063630 A1    Mar. 24, 2005

(30) Foreign Application Priority Data

Sep. 4, 2003   (DE) ............... 103 40 675
Dec. 18, 2003  (DE) ............... 103 59 638

(51) Int. Cl.
F16C 33/02 (2006.01)

(52) U.S. Cl. ........................ 384/617; 428/43

(58) Field of Classification Search ............... 384/609, 384/611, 615, 617, 618, 620–622; 428/43
See application file for complete search history.

(56) References Cited

U.S. PATENT DOCUMENTS

| 3,008,788 | A | * | 11/1961 | Garner | .................. 312/309 |
| 4,274,655 | A |   | 6/1981  | Lederman | |
| 4,541,744 | A |   | 9/1985  | Lederman | |
| 4,690,425 | A |   | 9/1987  | Kubo | |
| 4,699,530 | A | * | 10/1987 | Satoh et al. | ............... 384/609 |
| 5,074,579 | A |   | 12/1991 | Evangelisti | |
| 5,232,290 | A |   | 8/1993  | Buschle et al. | |
| 5,454,585 | A |   | 10/1995 | Dronen et al. | |
| 5,467,971 | A |   | 11/1995 | Hurtubise et al. | |
| 5,690,319 | A |   | 11/1997 | Robinson et al. | |
| 6,257,605 | B1 |  | 7/2001  | Zernickel et al. | |
| 6,290,218 | B1 |  | 9/2001  | Mayerböck | |
| 6,296,396 | B1 |  | 10/2001 | Schwarzbich | |
| 6,550,755 | B2 | * | 4/2003 | Ehrhardt et al. | ............ 267/286 |
| 2003/0047897 | A1 | | 3/2003 | Hurrlein et al. | |
| 2005/0089255 | A1 | * | 4/2005 | Debrailly et al. | ........... 384/609 |

FOREIGN PATENT DOCUMENTS

| DE | 198 09 074 A1 | 1/1999 |
| DE | 198 06 829 C1 | 8/1999 |
| DE | 101 26 680 C1 | 1/2003 |
| DE | 101 44 164    | 8/2003 |
| GB | 2 217 663     | 11/1989 |

* cited by examiner

Primary Examiner—Richard W Ridley
Assistant Examiner—James Pilkington
(74) Attorney, Agent, or Firm—Cohen Pontani Lieberman & Pavane LLP

(57) ABSTRACT

A bearing housing with at least one bearing for the vibration damper, where the bearing has a bearing input part and a bearing output part, which are able to rotate with respect to each other during operation. The bearing has an assembly lock, which prevents the bearing input part from rotating with respect to the bearing output part during installation in a vehicle.

9 Claims, 6 Drawing Sheets

BEARING FOR A VIBRATION DAMPER

BACKGROUND OF THE INVENTION

1. Field of the Invention

The invention pertains to a bearing arrangement for a vibration damper, the arrangement including a bearing housing, a bearing input part which is fixed against rotation with respect to the housing, and a bearing output part which, in operation, is rotatable with respect to the input part.

2. Description of the Related Art

A bearing for a spring strut unit which has two independent bearings so that the relative motion between the cylinder and the bearing can occur with the least possible amount of friction is known from DE 101 26 680 C1. A stop buffer is supported on the bearing; depending on the design, this stop buffer may have to be aligned in the circumferential direction with respect to the installation position of the bearing. In another case, the vibration damper is designed as a spring strut unit, and a spring plate on the piston rod side must occupy a precise angular position with respect to the bearing.

In the past, the components in the cases mentioned above by way of example have been aligned by hand, possibly with the help of a device on the vehicle. This procedure, however, is quite tedious, because there is very little space available inside the wheel well of the vehicle. The presence of a bearing point makes the problem of installing and correctly aligning the various components of the vibration damper even more difficult, because it is very easy for the components in question to rotate with respect to each other; such rotation can even occur, for example, when the vibration damper is being removed from the delivery packaging.

The task of the present invention is to solve this problem known from the state of the art.

SUMMARY OF THE INVENTION

According to the invention, the bearing has an assembly lock, which prevents the bearing input part from rotating with respect to the bearing output part during installation in a vehicle.

The assembly lock is designed in a way which guarantees the ability of the input part to rotate relative to the bearing output part after installation.

The bearing output part is therefore connected by a predetermined breaking point to a component which is stationary with respect to the bearing housing. The predetermined breaking point can be designed to break under comparatively weak forces, so that the driver will not be aware of the breakage of the predetermined breaking point when the inward travel movement or steering movement occurs for the first time.

In a first variant, the bearing output part has a tab, which is supported on the fastening means by which the bearing housing is fastened to the vehicle. The bearing output part is always rotated into the proper, predetermined position simply by the performance of the proper fastening procedure, as a result of which any other element which is be to installed with a certain orientation to the bearing is also aligned simultaneously In another variant, the bearing input part and the bearing output part are connected to each other by a predetermined breaking point. As a result, the alignment of the bearing output part is guaranteed by the bearing input part.

In another advantageous embodiment, the bearing input part and the bearing output part have housings, on which the predetermined breaking point is provided. In addition, the two housings represent parts which can be folded onto each other.

At least one of the two housings has a marking, which makes it possible to align the housing with the bearing housing. The complete bearing is installed with the help of a device, so that it is possible, by means of this device, to install the housing, for example, in the properly oriented position with respect to the bearing housing.

The housing can enter into a positive, circumferentially oriented connection with the bearing housing. The flow of forces will then extend from the bearing housing via the bearing input part and the predetermined breaking point to the bearing output part.

According to another embodiment, the bearing output part is designed as an integral part of a spring plate for a vehicle suspension spring. As a result, the spring plate is necessarily oriented precisely with respect to the bearing housing.

In addition, the bearing output part can be designed with a positive circumferential working connection to a stop buffer.

It is also provided according to the invention that the bearing is designed with a slant to the longitudinal axis of the vibration damper, where the bearing housing has a profiled ring with a cross section which is uniform in the axial direction, and where the housing of the bearing input part is designed with an axial height which varies around the circumference. Thus the profiled ring can be designed as an elastomeric ring, which quite specifically can execute relative axial movement in response to the elastic travel of the input and output parts of the bearing relative to the overall bearing. assembly In another advantageous embodiment, the bearing housing has a ring-shaped groove with a flat base surface for the profiled ring. As a result, the bearing can be provided with a flat contact surface for its connection to the vehicle body. Overall, a comparatively small amount of work is required to shape the bearing, i.e., the bearing housing.

So that the slanted bearing can also be reliably installed in the proper position, an installation-orienting connection is present between the profiled ring and the housing.

In the further course of the flow of forces, the profiled ring and the bearing housing form a positive rotary connection, so that, when the parts are laid in the bearing, all of the components assume their proper angular positions.

For this purpose, the ring-shaped groove has at least one radial expansion, into which the profiled ring projects. There is no need for any additional axial space to accommodate the positive connection.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
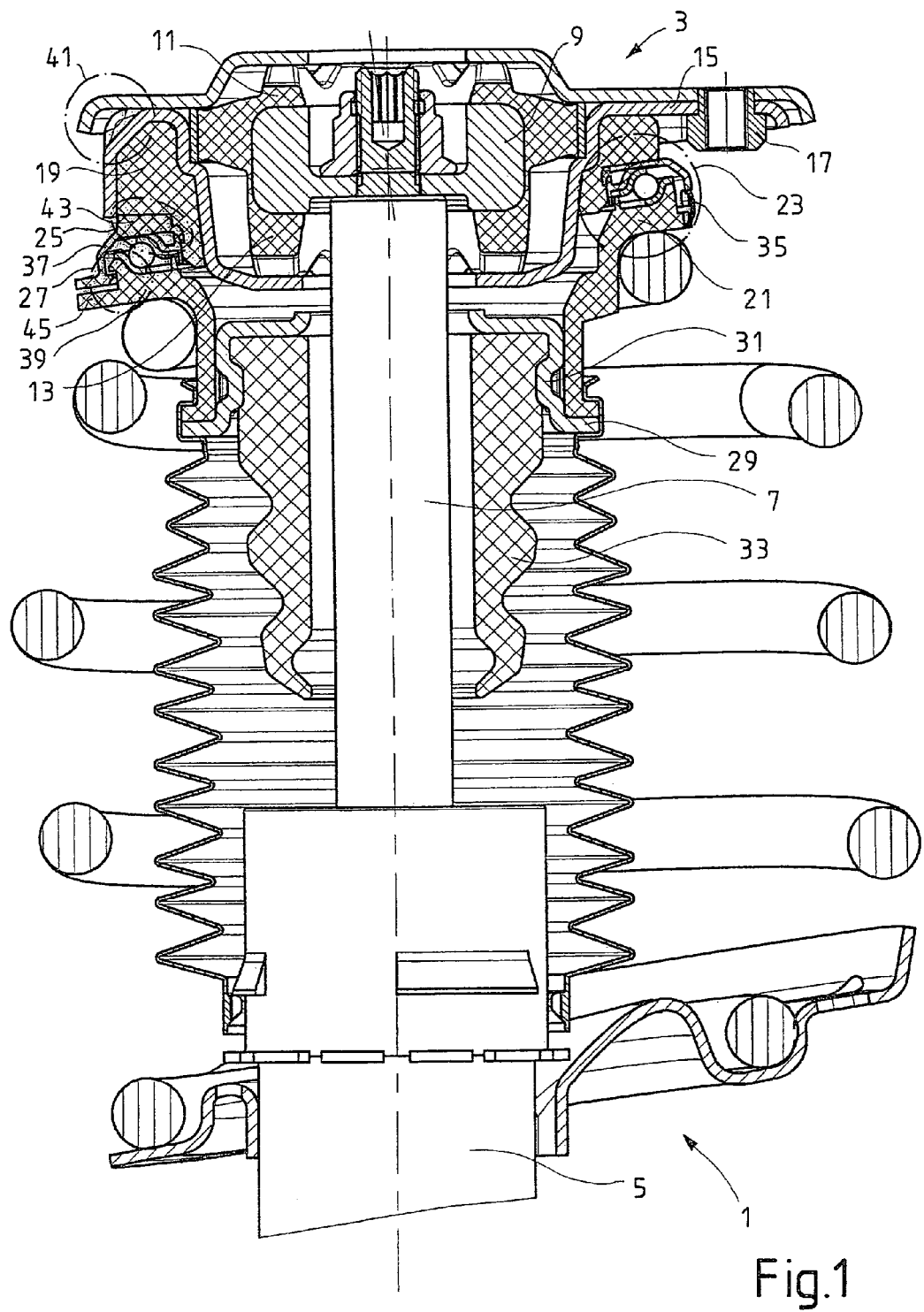
FIG. 1 shows the upper section of a vibration damper with a bearing.

FIG. 1 shows a vibration damper 1 with a bearing 3 on a vehicle body. An axially movable piston rod 7, which carries the bearing at its outer end, is guided in a cylinder 5. A support disk 9 attached to the piston rod has elastomeric bodies 11, 13, one on top and one on the bottom, which are pretensioned by a bearing housing 15. Fastening means 17 for fastening the bearing to the auto body are provided on the housing 15.

An elastomeric body 19 to support a spring plate 21 for a vehicle suspension spring is mounted on the bottom surface of the bearing housing, where the spring plate is able to execute rotary movement relative to the vehicle body by means of a bearing 23, in the form of a roller bearing, mounted at a slant to the longitudinal axis of the vibration damper. The bearing 23 has a bearing input part 25 and a bearing output part 27, where the bearing output part 27 and the spring plate 21 are designed as a single piece. A support sleeve 29 is attached nonpositively to the spring plate 21; this sleeve has radial projections 31, which engage with a stop buffer 33. As soon the piston rod has traveled a certain distance, the stop buffer 33 makes contact with the upper end surface of the cylinder 5 and produces an additional spring force. In some cases, the stop buffer must be aligned in the circumferential direction with respect to the piston rod, so that, for example, a certain spring characteristic can be obtained or so that it will occupy a predetermined installation position. For this purpose, the stop buffer 33 must be aligned with respect to the fastening means 17. The bearing 23 is intended to make it possible for the spring plate 21 to move with respect to the piston rod. This freedom of movement, however, is undesirable during the installation of the bearing, because otherwise the alignment of the stop buffer 33 would no longer be guaranteed.

For this reason, the bearing has an assembly lock 35, which prevents the bearing output part from rotating with respect to the bearing input part. This assembly lock is formed by a frangible connection, which connects the bearing input part 25 to the bearing output part 27.

Figure 2:
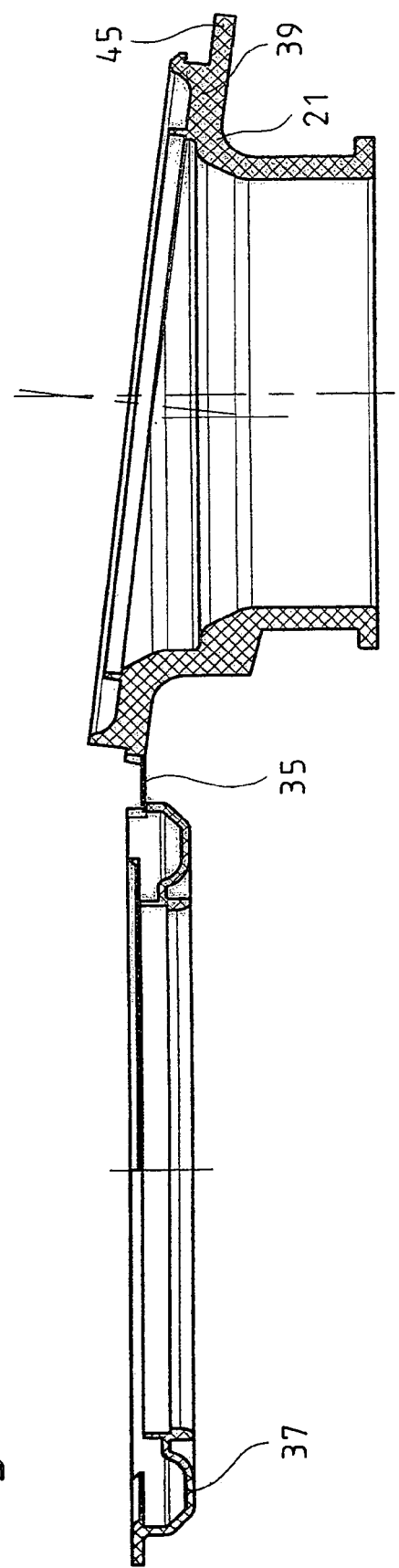
FIG. 2 is a section view of the bearing housing prior to assembly.
Figure 3:
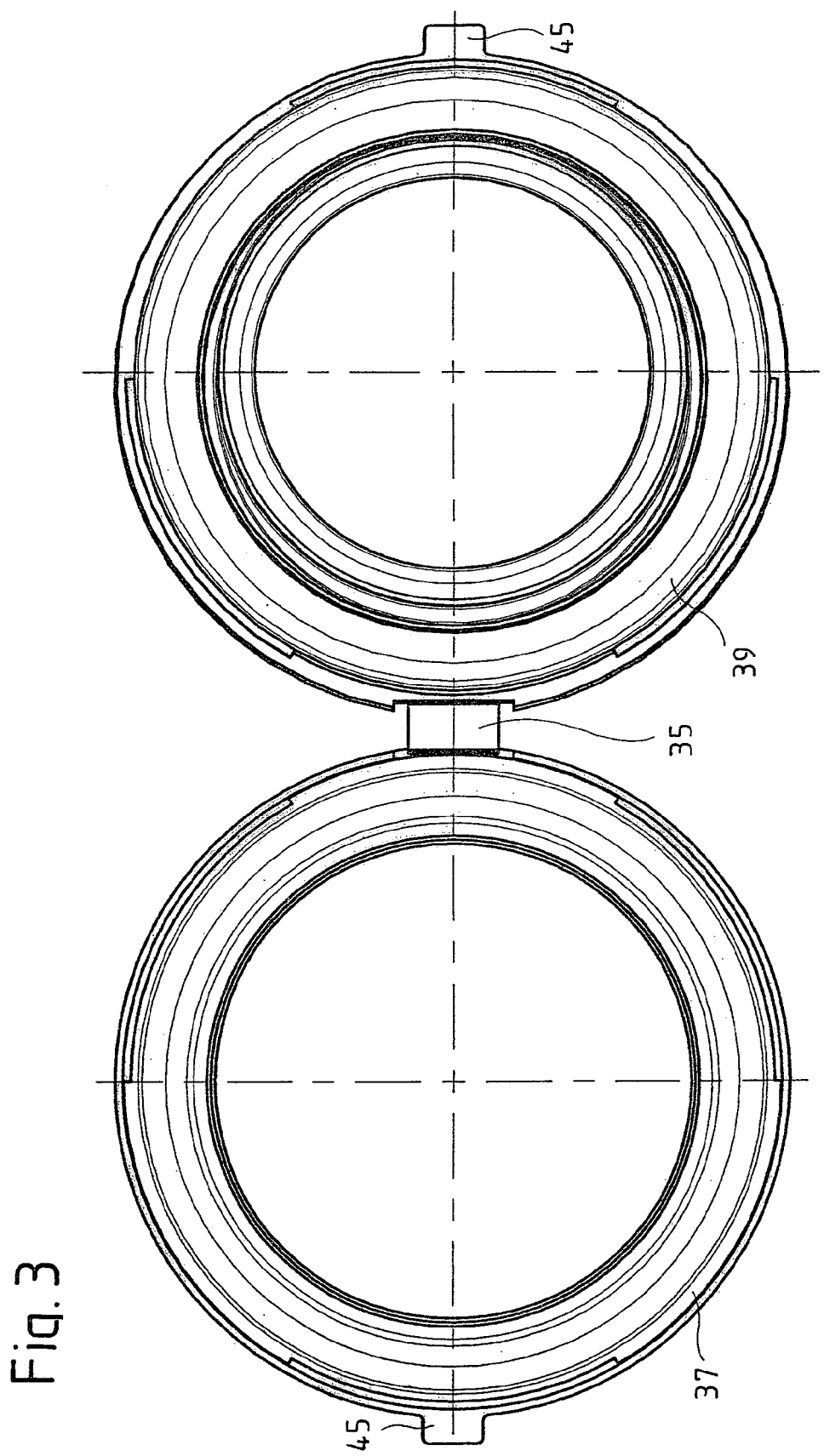
FIG. 3 is a plan view of the bearing housing of FIG. 2.
Figure 4:
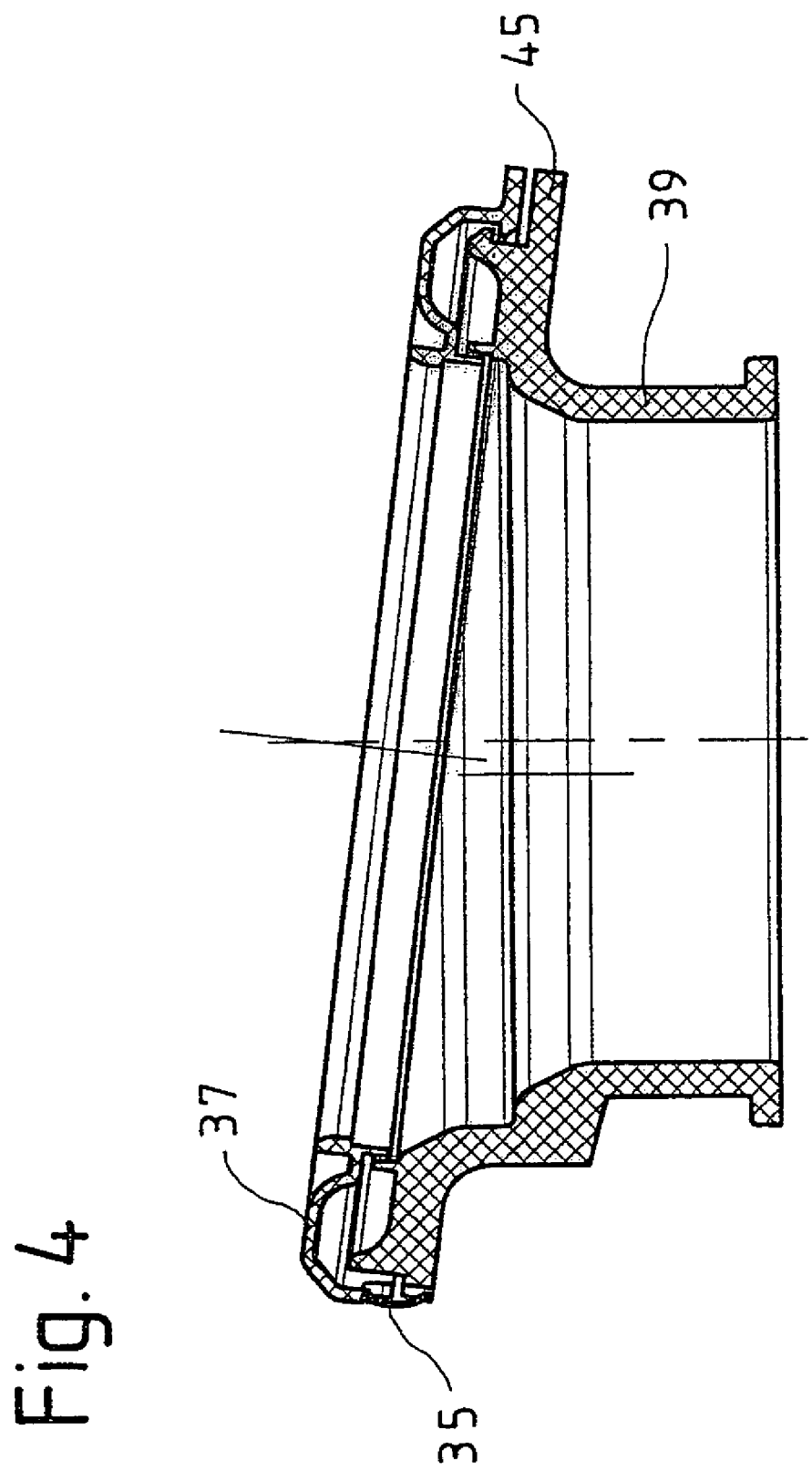
FIG. 4 is a section view of the bearing housing of FIG. 2 after assembly.

FIGS. 2-4 show this relationship clearly. The bearing input part 25 and the bearing output part 27 have housing parts 37, 39; these housing parts are connected to each other by the frangible connection 35, which allows the housing parts to be folded together. The frangible connection 35 can be formed by a comparatively thin-walled strip of material.

When the components are installed, the bearing housing, which has already been provided with the support disk 9 and the two elastomeric bodies 11, 13, which can also be made as a single part, is laid in a device, where the fasteners 17 are used as reference marks with respect to the device. Then the elastomeric body 19 is inserted, which, in a subvariant, can enter into a positive connection 41 with the bearing housing 15, so that it will occupy a defined installation position in the circumferential direction. In addition, the housing part 37 of the bearing input part 25 can be provided with an axial elevation 43, which in turn forms a positive connection with the elastomeric body. Alternatively, a press-fit can be present between the elastomeric body and the bearing input part, so that a nonpositive connection can be achieved for the attachment of the components in question. The previously described assembly lock 35 holds the bearing output part 27 and thus also the stop buffer 33 firmly in place in the vehicle until the vibration damper is put into service.

Alternatively, the positive connection between the elastomeric body and the bearing housing and the housing part 37 of the bearing input part 25 can be omitted if, alternatively, a marking 45 is used, which determines the position of the bearing output part 27 relative to the housing of the bearing, where this function can be assumed by the device for the overall bearing. FIGS. 2-4 show the tongue-like markings 45 on the two housing parts 37, 39 of the bearing. A marking on the housing part of the bearing input part would not be absolutely necessary, but the double marking makes it very easy to establish whether or not the two housing parts were possibly deformed during installation.

Figure 5:
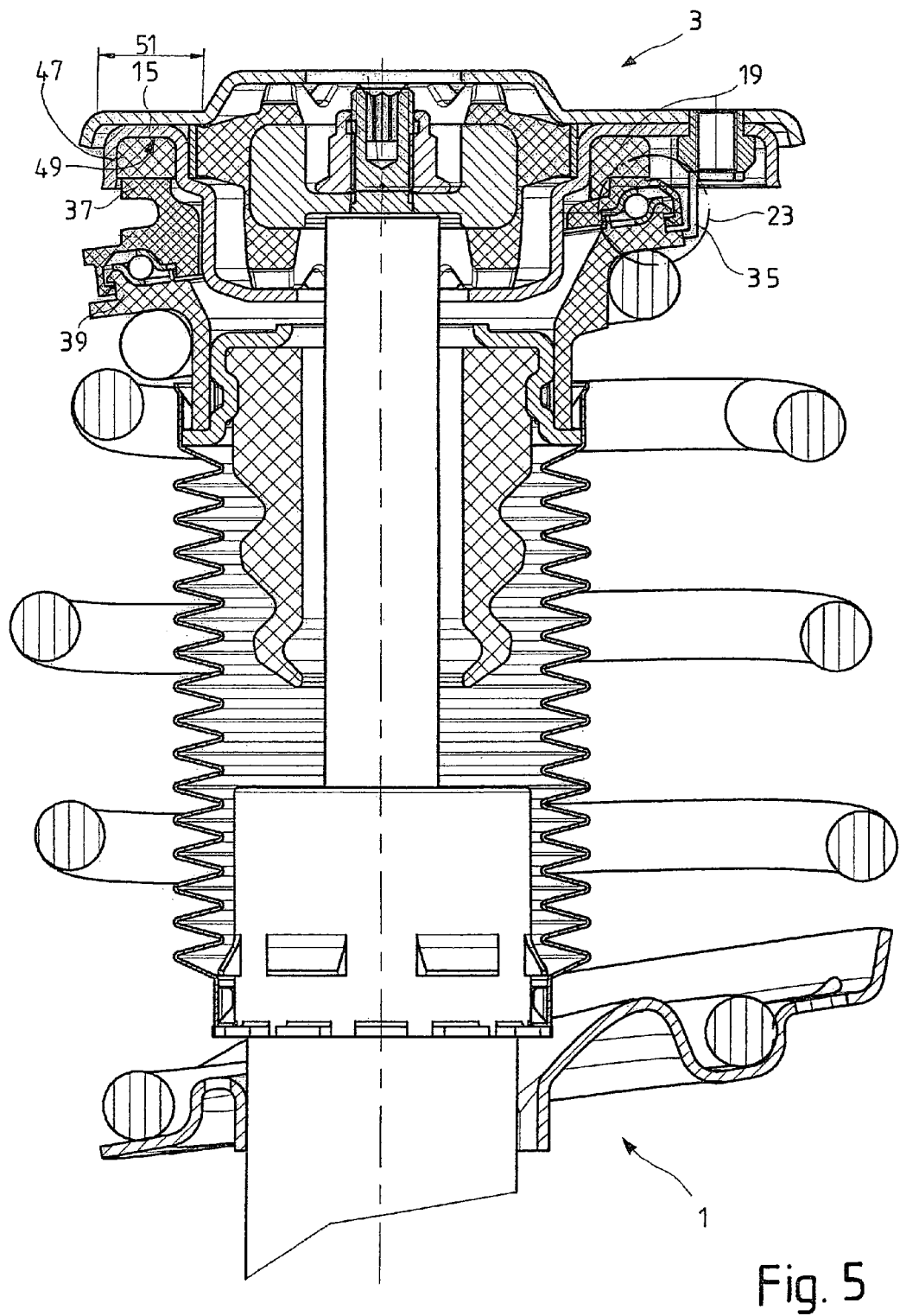
FIG. 5 shows a modification of the damper according to FIG. 1 with the mounting connection on the bearing housing.

FIG. 5 shows a bearing 3 very similar to that of FIG. 1. The essential difference is that the strip 35 is a tab formed on the bearing output part and connected to the fastener 17. Another difference is that the elastomeric body 19 is designed as a profiled ring between the bearing housing 15 and the housing part 37 of the bearing input part 25, i.e., as a simple ring with a uniform cross section in the axial direction. For the sake of the slanted position of the bearing, the housing 37 of the bearing input part is provided with an axial height which varies around its circumference, in that the bottom surface of the upper housing part 37 is designed with the angle required for the desired slant of the bearing 23 with respect to the top surface of the part 37. The bearing housing 15 has an annular channel 47 for the elastomeric body 19; this channel thus provides the elastomeric body with radial guidance. The base surface 49 of the annular channel 47 is flat, so that, for the overall bearing 3, a cover which is also flat in the area of the channel can be used. This flat cover thus offers a large contact surface 51 for the vehicle body (not shown). The housing 37 can be supported radially against the bearing housing 15 and can also move axially at the bearing housing 15 when the vibration damper moves elastically. Alternatively, it is also possible for the housing 37 to be supported radially against the elastomeric body 19, as shown on the right in the cross section of FIG. 5.

Figure 6:
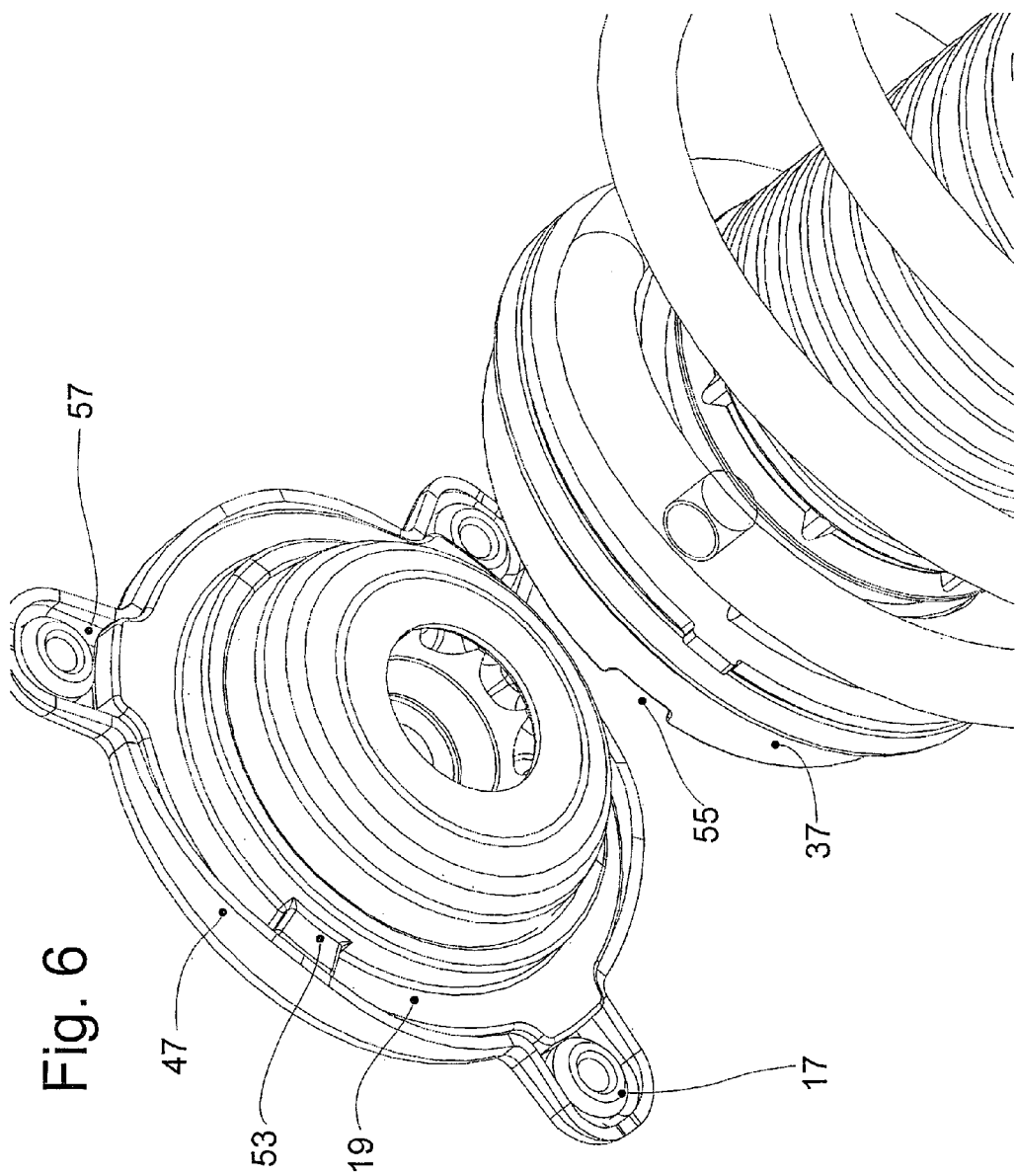
FIG. 6 is an exploded perspective of the damper of FIG. 5.

Between the elastomeric body 19 and the housing 37 there is, as shown in FIG. 6, an installation-orienting connection, which is formed by a number of axial projections 53 of the elastomeric body 19, which engage in corresponding pockets 55 in the housing 37. The elastomeric body 19 and the bearing housing 15 also form a positive rotational connection. It can be seen in FIGS. 5 and 6 that the annular channel 47 for the elastomeric body 19 is expanded in the area of the fastening means 17. The elastomeric body projects into these radial expansions 57 of the channel, so that a fixed relationship is obtained between the elastomeric body and the arrangement of the fastening means 17. Thus it is also ensured that the slanted bearing 23 assumes the prescribed orientation in the circumferential direction with respect to, for example, the longitudinal axis of the vehicle.

When the vehicle is put into service or possibly even during the installation process itself, the occurrence of inward travel has the effect of opening the predetermined breaking point, so that the driver is not even aware that the bearing has been "released". The broken pieces of the predetermined breaking point cannot interfere with the operation of the bearing, because the pieces are outside the housing.

The invention is not limited by the embodiments described above which are presented as examples only but can be modified in various ways within the scope of protection defined by the appended patent claims.

I claim:

1. A bearing arrangement for a vibration damper in a vehicle, said arrangement comprising:
    a bearing housing;
    a bearing input part which is fixed against rotation with respect to the bearing housing;
    a bearing output part which, in operation, is rotatable with respect to the input part; and
    an assembly lock which prevents rotation of the output part relative to the input part during installation in a vehicle, the assembly lock comprising a frangible connection formed by a strip of material between the output part and a component which is stationary with respect to the bearing housing.

2. A bearing arrangement as in claim 1 further comprising a fastener for fixing the bearing housing to the vehicle, the strip of material comprising a tab which is formed on the bearing output part, the tab being fixed to the fastener.

3. A bearing arrangement as in claim 1 wherein the frangible connection connects the bearing input part to the bearing output part.

4. A bearing arrangement as in claim 3 wherein the bearing input part and the bearing output part each comprise a housing part, the housing parts being connected by the frangible connection.

5. A bearing arrangement as in claim 4 wherein the frangible connection serves as a hinge whereby the housing parts can be folded onto each other.

6. A bearing arrangement as in claim 4 wherein at least one of the housing parts has a marking for aligning the housing parts with respect to the bearing housing.

7. A bearing arrangement as in claim 4 wherein the housing of the bearing input part is positively connected against rotation with respect to the bearing housing.

8. A bearing arrangement as in claim 1 further comprising a spring plate for a vehicle suspension spring, the bearing output part being formed as one piece with the spring plate.

9. A bearing arrangement as in claim 1 further comprising a stop buffer which is fixed circumferentially to the bearing output part.

* * * * *